Oct. 3, 1961   T. S. BRISKIN ET AL   3,002,435
CAMERA HAVING AUTOMATICALLY CONTROLLED LENS STOP
Filed Aug. 23, 1956   5 Sheets-Sheet 1

Inventors:
Theodore S. Briskin
Robert L. Moore
Theodore Wickstrom
By Zabel, Baker, Ynk,
Jones & Dithmar
Attorneys

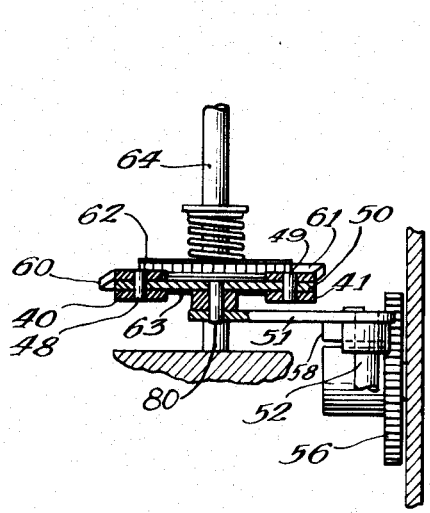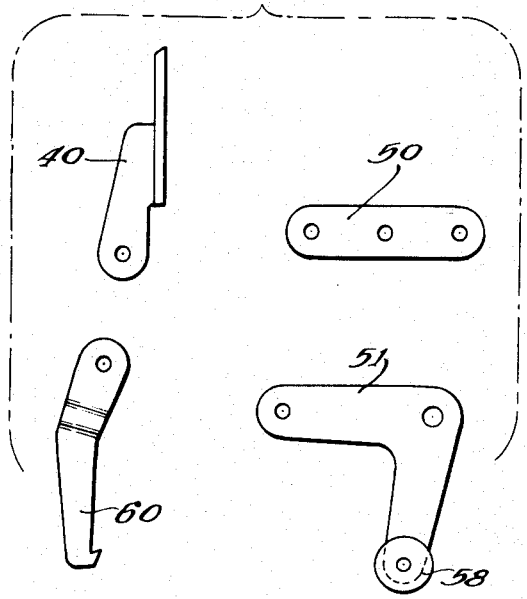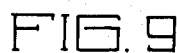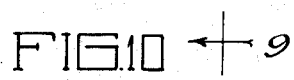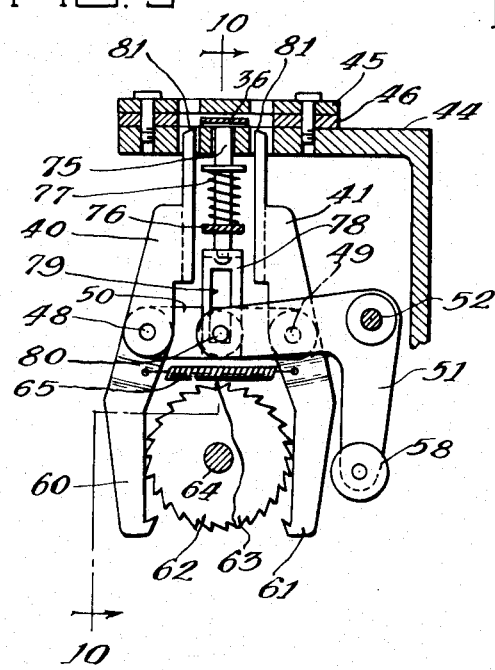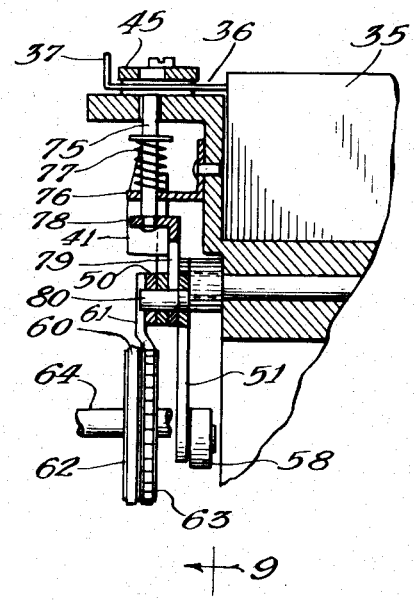

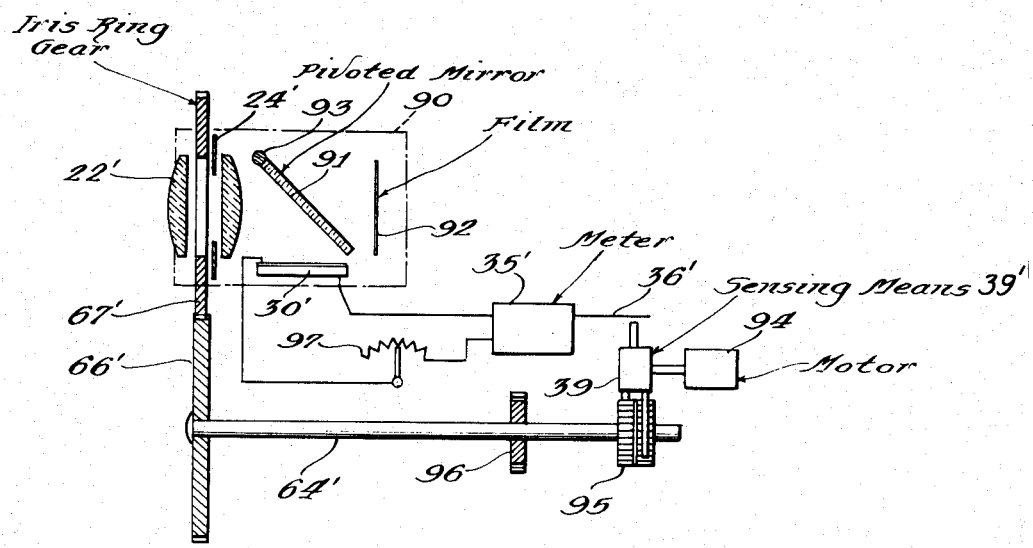
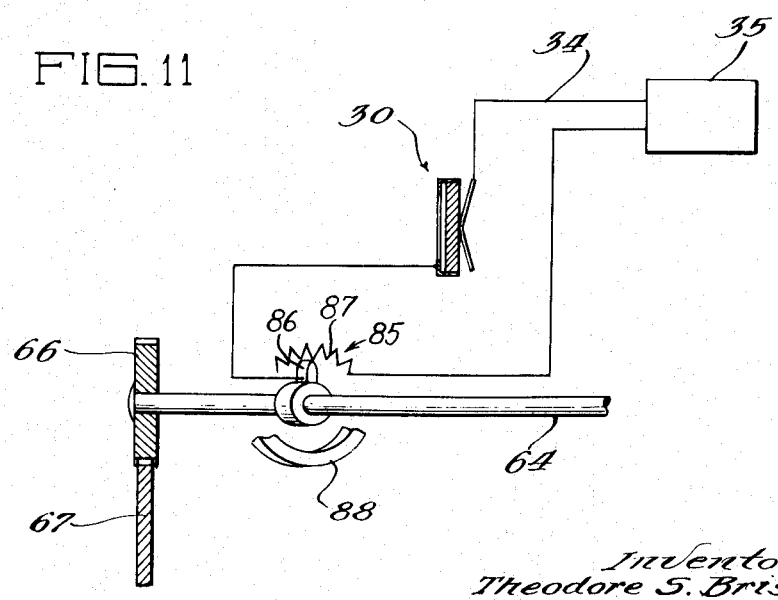

United States Patent Office 3,002,435
Patented Oct. 3, 1961

3,002,435
CAMERA HAVING AUTOMATICALLY CONTROLLED LENS STOP
Theodore S. Briskin, Chicago, Robert L. Moore, La Grange Highlands, and Theodore Wickstrom, Skokie, Ill., assignors to Revere Camera Company, Chicago, Ill., a corporation of Delaware
Filed Aug. 23, 1956, Ser. No. 605,874
10 Claims. (Cl. 95—10)

This invention relates to cameras having automatically controlled lens stops.

It has heretofore been proposed to incorporate a light meter in a camera in order to facilitate the adjustment of the lens stop.

It is an object of the present invention to provide an improved camera having power means for changing the lens stop or aperture and in which a light sensitive device controls the operation thereof.

It is a further object to provide a camera embodying a light meter in which the field of the light sensitive element thereof is co-extensive with the field of the camera lens.

It is a still further object to provide a motion picture camera having an automatically controlled lens stop, and in which the power means for actuating the same comprises the actual camera motor, such as a spring motor.

The invention is described herein with reference to a motion picture camera, and with particular reference to one in which the lens stop constitutes an iris, but it will be understood that the invention in its broader aspects is equally applicable to a still camera which incorporates power means for actuating the lens stop, and to either still or motion picture cameras having a lens stop other than the iris type, such, for example, as a Waterman stop.

The foregoing objectives are achieved by providing a light meter whereof the output of the meter component comprises the displacement of a mechanical element such as a needle to either side of a neutral position, in combination with sensing means for sensing such displacement of the needle. A further object of this invention is to provide a novel type of sensing means which can be powered from the spring motor of a motion picture camera, or from other types of mechanical energy storing means which might be suitable for incorporation into a still camera.

Still another object of this invention is to provide in a camera having an adjustable lens stop, a self-governing light meter for providing a constant light energy input together with means for coupling said self-governing light meter to said adjustable camera lens stop so that a substantially constant light energy input can be maintained for a film disposed in cooperative relationship with the camera lens.

A still further object is to provide an improved device of the type indicated, the operation of which is such that the light sensitive device may be disposed within the chamber of the camera itself.

Other objects, features and advantages will become apparent as the description proceeds. With reference now to the drawing in which like reference numerals designate like parts:

FIG. 7 is a horizontal section taken along line 7—7 of FIG. 4;

FIG. 8 is a composite view showing the details of certain of the parts;

FIG. 9 is a view similar to FIG. 4, but showing a modified type of sensing means;

FIG. 10 is a vertical section taken along line 10—10 of FIG. 9;

FIG. 11 shows a modified form of this invention; and

FIG. 12 diagrammatically illustrates a further modification.

Figure 1:
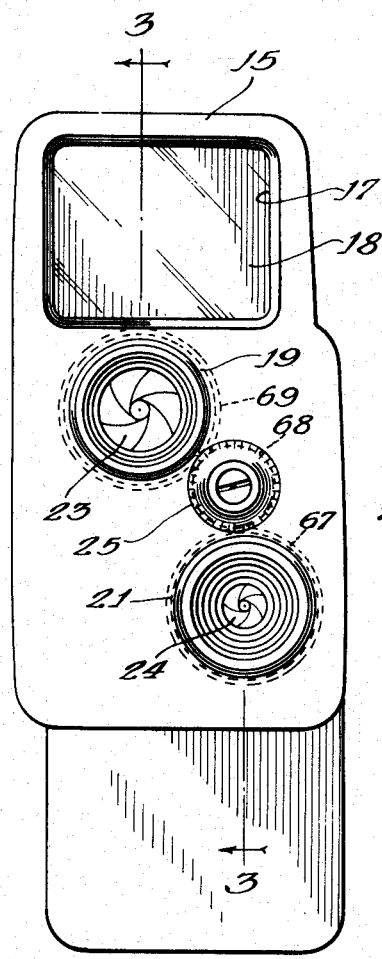
FIG. 1 is a front elevation of a camera embodying this invention.
Figure 2:
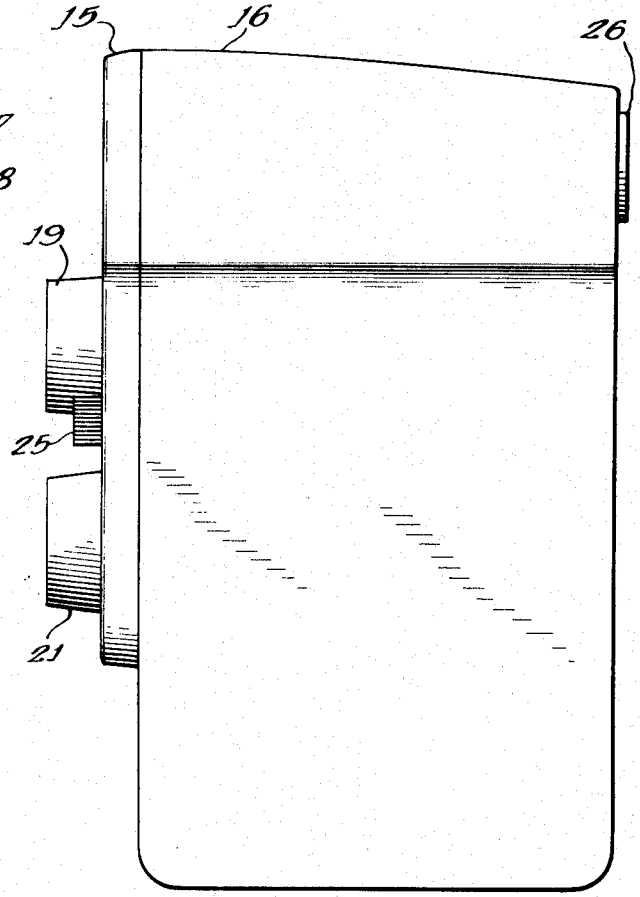
FIG. 2 is a side elevation thereof.
Figure 3:
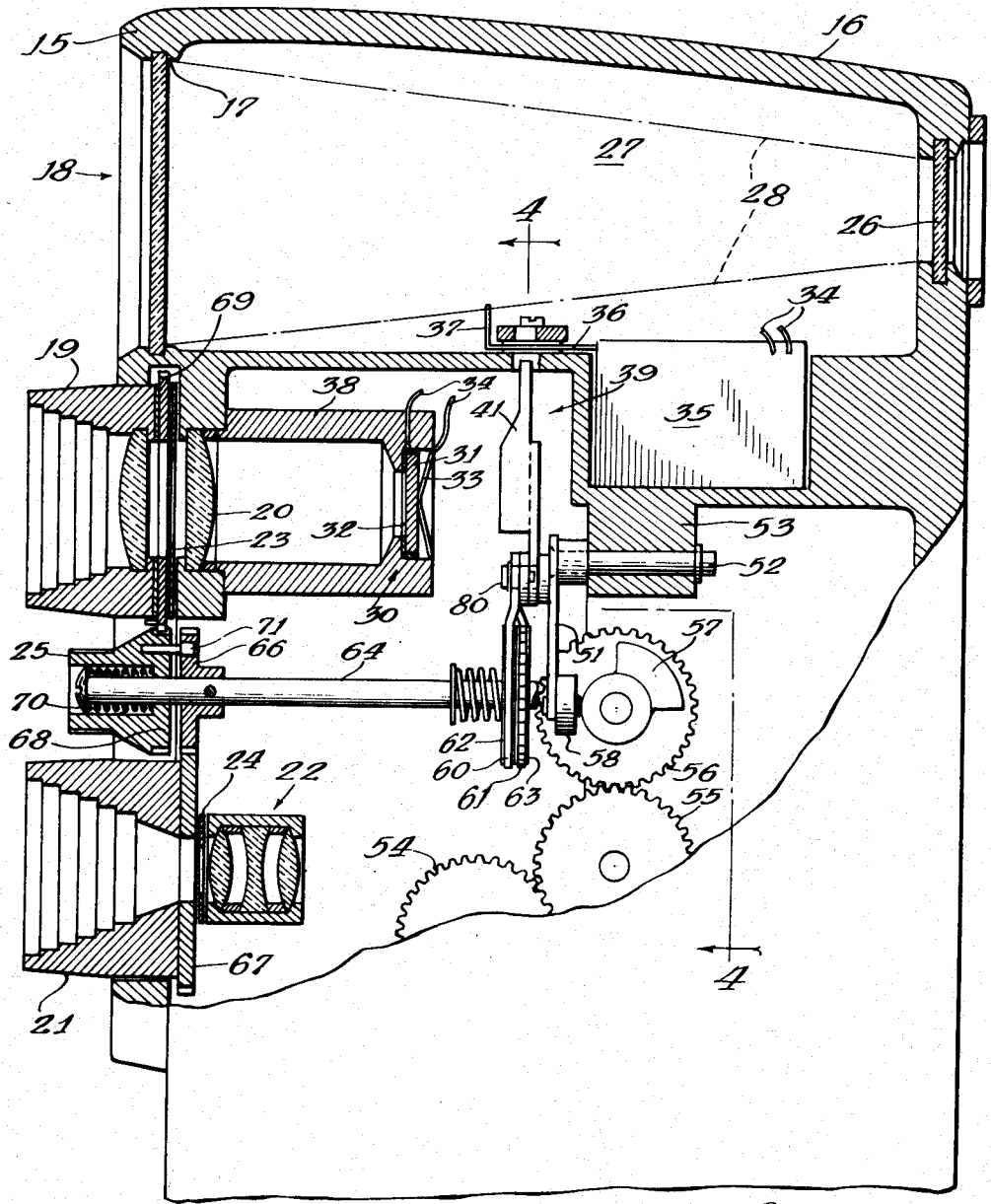
FIG. 3 is a vertical longitudinal section thereof taken substantially along the line 3—3 of FIG. 1.

With reference now to FIG. 1 and FIG. 2, the motion picture camera shown therein includes a front plate 15 and a casing 16 secured thereto. An opening 17 is formed in a front plate to provide a view finder 18. Also mounted on the front plate is a hood 19 for the lens system 20 of a light meter, and the hood 21 for the camera lens system 22. Disposed between the hoods 19 and 21 is a rotatable adjusting knob 25. On the back surface of the casing 16 is an eye piece 26 for the view finder 18. As shown in FIG. 3, the view finder 18 includes a passageway 27 extending through the casing 16, the view finder serving to define an objective field, the extent of which is indicated by the converging dotted line 28.

Disposed within the casing 16 is a light meter comprising a photoelectric component 30 and a meter component 35 which are connected in series circuit with each other by suitable leads, 34.

The photoelectric component may be either of the resistive type or of the cell type, such as a photo-emissive cell, or a photovoltaic cell; however, the photovoltaic type is preferred since it eliminates the need for a voltage source.

As shown in FIG. 3, the photoelectric component 30 comprises a metallic disc 31 such as iron, having on one surface thereof a suitable photoelectric coating 32 such as metallic selenium or metallic silicon, together with the usual contact ring to which one of the leads 34 may be connected. The disc is suitably held in position by a spring clip 33. The whole assembly includes suitable mounting means 38, by means of which the photoelectric component 30 may be maintained in the focal plane of the meter lens system 20.

The meter component 35 of the light meter comprises the usual type of galvanometer which includes a needle 36 or other displaceable element, the movement of which constitutes the mechanical output of the system 30—35. The needle 36 may be provided with a bent end 37 which projects upwardly into the field of vision 28 of the view finder 18.

In operation, the photoelectric component 30 generates a small current which will cause deflection of the needle 36, but, in some instances, the power involved is too small to utilize mechanically. More specifically, the voltage of the electrical energy output of the photoelectric component 30 will vary as the light energy input varies, with the result that the needle 36 will be displaced to one side or the other of a neutral position which corresponds to a predetermined calibration of the photoelectric component of the light meter assembly as a whole.

According to the present invention, means, in the nature of governing means, are provided for maintaining constant the electrical energy input of the meter 35, said means comprising means for sensing the position of the needle, together with control means actuated by said sensing means for regulating said electrical energy input.

Figure 4:
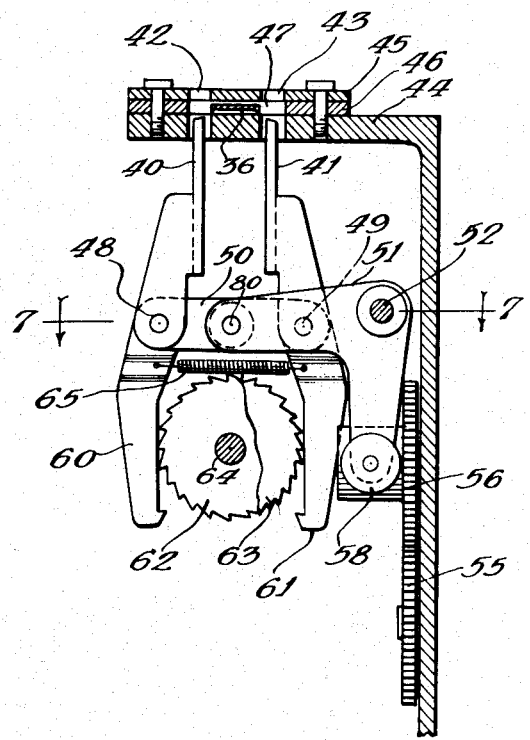
FIG. 4 is a vertical transverse section taken substantially along line 4—4 of FIG. 3.

The sensing means, generally indicated by the reference numeral 39, comprises a pair of reciprocable plungers 40 and 41 which extend upwardly through apertures 42 and 43, respectively, formed in a horizontal plate 44 and a suitable backing plate 45. The plates 44 and 45 are maintained in spaced relationship by a spacer frame 46 in order to provide a chamber 47 into which the needle 36 extends. When the needle is in its neutral position, as shown in FIGS. 4 and 5, the apertures 42 and 43 are unobstructed; displacement of the needle in either direction is limited by the spacer frame 46, and blocks the apertures.

The plungers 40 and 41 are pivotally connected at 48 and 49, respectively, to a yoke 50 to the end that the reciprocating movement of the plungers may be substantially rectilinear. Reciprocating motion is imparted to the yoke 50 by a bell crank 51 which is mounted on a suitable pivot 52 set into a portion of the casting which constitutes the casing 16. The horizontal plate 44 may also be a part of this casting. A pivoted connection 80 is provided between the yoke 50 and the bell crank 51 to permit differential movement of the plungers 40 and 41 as pointed out hereinafter.

The sensing means is driven from the spring motor, not shown, of the motion picture camera which is also utilized to drive the conventional claw, shutter, and film spool. The output of the spring motor is represented by a drive gear 54 (FIG. 3) which drives, through idler 55, a cam gear 56. The latter is provided with a face cam 57 of substantially 90°. The bell crank is provided with a follower 58 which is biased by suitable spring means into engagement with the cam 57 to cause oscillation of the bell crank and reciprocation of the plungers 40 and 41 whenever the motor is turned on to drive the film.

Figure 5:
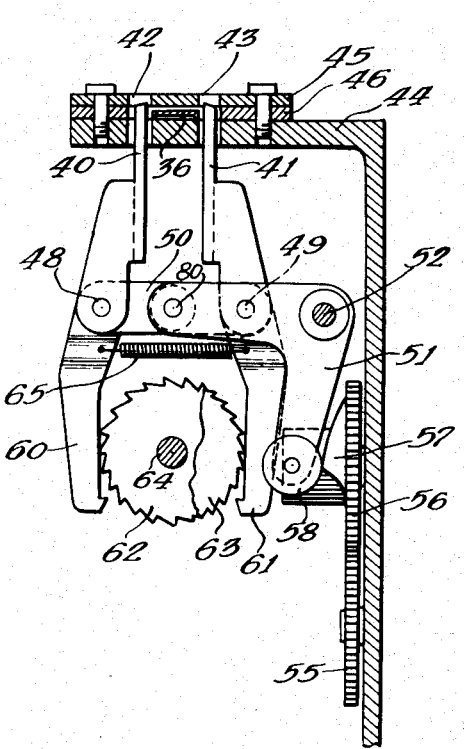
FIG. 5 is a view similar to FIG. 4, but showing a changed position of the parts.

In operation, if the needle 36 is displaced to the left, then the movement of the plunger 40 will be obstructed with the result that the yoke 50 will rock about its pivoted connection 80 and cause movement of the plunger 41 to an extent which is twice as great as the normal movement, the extent of which normal movement is shown in FIG. 5. Similarly, when the needle 36 is displaced to the right, then the plunger 40 will move upwardly to an extent equal to twice its normal movement. This differential movement, or overthrow, is utilized to actuate the control means by means of which the electrical energy input of the meter 35 is maintained constant.

In the embodiment shown in FIGS. 1 to 8, the control means comprises the meter iris 23, together with an output shaft 64, and pawl and ratchet means for controlling the angular displacement thereof.

As shown in FIGS. 3 and 4, pawls 60 and 61 are pivotally connected to and depend from the plungers 40 and 41 respectively. Two oppositely disposed ratchet wheels 62 and 63 are secured to the shaft 64 for engagement with the pawls 60 and 61, respectively, although a single ratchet wheel each tooth of which provides oppositely disposed ratchet surfaces may be substituted for the two ratchet wheels shown. A suitable spring 65 extending between the pawls 60 and 61 urges them into engagement with their respective ratchet wheels.

Figure 6:
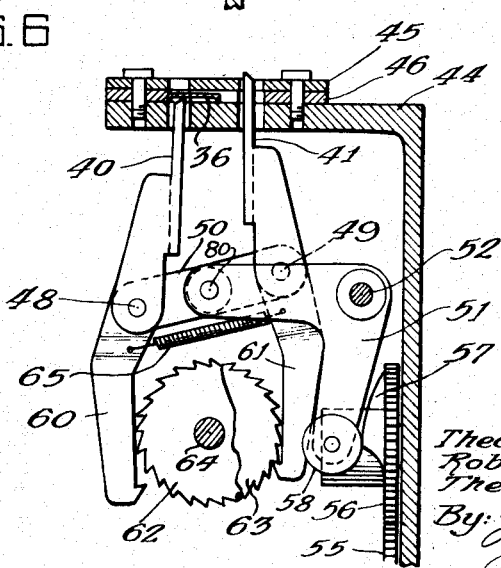
FIG. 6 is a view similar to FIGS. 4 and 5, but showing the parts in a still different position.

The spacing of the teeth of the pawls 60 and 61 with respect to the teeth of the ratchet wheels 62 and 63 is such that normal movement of the pawls is insufficient to cause engagement. However, upon the overthrow, as shown in FIG. 6, one pawl will engage its ratchet and cause rotation of the shaft 64 through a predetermined angular extent. The cam gear 56 may be rotated at any suitable speed, such as two or three times a second, to the end that the ratchet wheel 63, as illustrated in FIG. 6, will be advanced step by step two or three times a second until such time as the light input to the photoelectric component 30 is restored to normal, at which time the needle 36 returns to its neutral position.

Connection between the shaft 64 and the camera iris 24 is made by a gear 66 secured to the shaft 64 which meshes with the ring gear 67 of the camera iris 24. A second gear 68 is secured to the adjusting knob 25 and meshes with the ring gear 69 of the meter iris 23. The second gear 68 is axially slidable on the shaft 64, but is biased into mesh with the ring gear 69 by a spring 70. A pin 71 ties together the two gears 66 and 68 without interfering with the axial displacement of the latter with the result that rotation of the shaft 64 also causes adjustment of the meter iris 23.

The operation of the mechanism above described therefore assures constant light energy input to the photoelectric component 30. If there is too much light, the needle will be deflected, say to the left, as shown in FIG. 6, with the result that the shaft 64 will be rotated in the counter clockwise direction and cut down the aperture provided by the meter iris 23 until the light energy reaching the photoelectric component 30 is again at its normal quantum. Similarly, if the light energy is below the calibrated quantum, plunger 40 will overthrow and cause rotation of the shaft 64 in the clockwise direction, thus increasing the aperture until the normal quantum of light energy is received by the photoelectric component 30. Thus, the mechanism above described is essentially a light governor assuring constant light energy input by angular displacement of the meter iris gear 69.

Since, in taking pictures, the problem is essentially one of securing constant light input through the camera lens in order to secure uniform exposure of the camera film, the governing action which resulted in displacement of the shaft 64 in one direction or the other is also utilized to adjust the camera iris 24. In other words, since the two ring gears 67 and 69 are tied together by the gears 66 and 68, constant light input through the meter lens 20 naturally results in constant light input through the camera lens 22. This arrangement is of particular utility in taking motion pictures, since the field of vision changes from frame to frame as the camera is focused on different objectives with the result that the light input is constantly varying. The governing mechanism herein described maintains the light input through camera lens 22 at the desired constant quantum irrespective of variations in the brilliance of the objective.

Since the quantum of light energy required will vary for different A.S.A. ratings of film, and with different speeds in terms of frames per second, the adjusting knob 25 provides suitable means for adjusting the relationship of the camera iris 24 with respect to the meter iris 23 to the end that an appropriate setting can be made before exposure of the film.

A modified form of sensing means is shown in FIGS. 9 and 10 in which a third plunger 75 is provided, the upper end of which extends into an aperture formed in the horizontal plate 44 to permit engagement with the needle 36. As shown in FIG. 10 the plunger 75 is slidably mounted in a bracket 76, and is surrounded by a spring 77 which biases the same against the needle 36. The spring 77 is confined between a suitable snap ring and the bracket 76. A link 78 provides a connection between the lower end of the third plunger 75 and the bell crank 51 so that the plunger is drawn downwardly and disengaged from the needle 36 at all times except during displacement of the bell crank 51 by the cam 57. The spring which maintains the follower 58 into engagement with the cam gear 56 and cam 57 is stronger than the spring 77. The link 78 is provided with a slot 79 which accommodates the connecting pin 80 so that the engagement between the third plunger 75 and the needle 36 will not impede free movement of the bell crank 51 and its associated parts.

Thus, in operation, the third plunger 75, which is slightly longer than the plungers 40 and 41, will engage the needle 36 and urge the same against the backing plate 45 to prevent any lateral movement of the same just prior to the time that the plungers 40 and 41 are extended. This clamping of the needle avoids the situation in which one of the plungers 40 or 41 engages just the side edge of the needle 36 and moves it in the opposite direction. This movement occasionally causes the needle to block the opposite plunger, thus causing the shaft 64 to be rotated in the wrong direction. According to the modification, this cannot happen since the needle is securely clamped between the third plunger 75 and the backing plate 45. To further reduce the likelihood of occurrence of this situation, the end edges of the plungers 40 and 41 may be ground to provide knife edges 81. The clearance between the needle 36 and the backing plate 45 is much less than that shown in the drawings in order to minimize any stress on the needle 36. However, the needle is made of flexible material so that any upward displacement of the end portion will not affect the delicate needle mounting means customarily provided in this type of meter.

As a further modification, it is possible to provide the desired clamping action by mounting either the horizontal plate 44 or the backing plate 45, or both, for movement toward each other in order to clamp the needle. The desired movement of the plates can be obtained by suitable cam means driven from the motor, such as the cam 57.

In the embodiment shown in FIG. 11, the control means does not operate to provide constant light input to the cell 30, as in the case of FIGS. 1 to 8, but it operates to provide constant voltage input to the meter 35. According to this modification, the output shaft 64 actuates the camera iris 24 and a rheostat 85; the meter lens system 20 is not provided with any iris.

The rheostat 85 is connected in series circuit with the cell 30 and the meter 35, and comprises a sliding contact 86 which is secured to the shaft 64, and a suitable resistance 87 mounted for cooperation therewith. Thus the rotation of the output shaft 64 in one direction or other will regulate the voltage of the electrical input into the meter 35 by electrical means, as contrasted with the mechanical means of the principal embodiment which regulates light energy input.

In order to compensate for different film ratings and camera speeds, a suitable mechanical adjustment may be provided between the gear 66 and the ring gear 67 or, in the alternative, the resistance 87 may be adjustably mounted as illustrated by the manually operable ring 88.

FIG. 12 shows a further modification in which the electrical energy input of the meter 35' is controlled by the light energy input of the photoelectric component 30' as in the case of principal embodiment, but in which the photoelectric component 30' is located within the camera enclosure itself, so that the camera lens iris 24' serves as a part of the control means for regulating the light energy input of the photoelectric component 30'.

According to this modification, the camera enclosure itself is designated by the reference numeral 90, and is provided with a camera lens system 22' having an adjustable iris 24'. Disposed within the enclosure 90 is a mirror 91 and suitable supporting means for a film 92. The mirror is mounted on a manually actuated shaft 93 so that it may be projected into the position shown in which the light which passes through the camera lens system 22' is focused on the photoelectric component 30'.

The position of the needle 36' is determined by sensing means 39' and the position of the iris 24' is regulated by control means which includes the pawl and ratchet mechanism 95, the output shaft 64', and the gears 66' and 67', in substantially the same manner as pointed out in connection with the principal embodiment. The sensing means is driven by a suitable motor 94. However, after the iris 24' has accommodated itself to the proper light condition, suitable means, such as a drum type of brake 96, is provided for maintaining the control means in its adjusted position. Then the mirror 91 may be retracted by actuation of the shaft 93 and the picture taken. This type of arrangement is well suited for still cameras.

A manually controlled rheostat 97 may be connected in series with the element 30' and 35' for setting the control mechanism to compensate for various film ratings and shutter speeds, as described in connection with FIG. 11, or in the alternative a suitable adjusting knob, such as the knob 25 of the principal embodiment, may be provided.

To summarize the operation, which has been described in detail in connection with the description of the various parts and sub-assemblies, when the camera is focused upon a particular objective, then the photoelectric component will also be focused upon the same objective, with the result that the intensity of the light passing through the meter lens 20 will be the same as the intensity of the light passing through the camera lens 22. Both irises will then automatically contract or expand in order to maintain the desired light energy input both to the film and to the photoelectric component 30.

In the case of a motion picture camera, the motor is operating during the time that the pictures are being taken with the result that the sensing means 39 is being continuously driven, thus providing automatic governing action of the light energy input.

In the case of a still camera wherein the position of the camera is necessarily maintained constant, the stop adjustment automatically takes place just prior to the exposure of the film. In the particular embodiment shown in FIG. 12, light is focused upon the photoelectric component 30' from the objective in the same manner as in the embodiment of FIGS. 1-8, but by a common lens 22'.

Although only preferred embodiments of this invention are shown and described herein, it will be understood that various modifications and changes may be made in the construction illustrated, without departing from the spirit of this invention as pointed out in the appended claims.

We claim:

1. In a motion picture camera including a motor for operating the same, the combination of a camera lens system and adjustable lens stop means therefor, an electric circuit including a photoelectric component and a meter in series circuit therewith, and having a displaceable needle responsive to the electrical energy input to said meter, power driven means for mechanically sensing the direction of displacement of said needle, control means driven by said sensing means for regulating said electrical energy input, means connecting said adjustable lens stop means and said control means whereby the aperture of said camera lens system is automatically controlled in accordance with said electrical energy input, and drive means in said camera for driving said sensing means, said drive means comprising said motor.

2. A camera as claimed in claim 1 in which said photoelectric component constitutes a photovoltaic cell.

3. A camera as claimed in claim 1 in which said control means comprises a lens disposed in front of said photoelectric component, and an iris for said lens, whereby the electrical energy output of said photoelectric component is controlled by regulation of the light energy input thereof.

4. A camera as claimed in claim 1 in which said control means includes a variable resistor in series circuit with said photoelectric component and said meter, and a rotatable shaft for operating said variable resistance.

5. In a camera, the combination of a camera lens system and adjustable lens stop means therefor, an electric circuit including a photoelectric component and a meter in series circuit therewith, and having a displaceable needle responsive to the electrical energy input to said meter, power driven means for mechanically sensing the direction of displacement of said needle, control means driven by said sensing means for regulating said electrical energy input, means connecting said adjustable lens stop means and said control means whereby the aperture of said camera lens system is automatically controlled in accordance with said electrical energy input, and drive means in said camera for driving said sensing means, said mechanical sensing means comprising a pair of spaced reciprocating plungers, the axes of which are disposed on opposite sides of said needle so that displacement of said needle to either side of a neutral position will block movement of one of said plungers, stop means to limit said displacement in either direction so that said needle will be maintained in a blocking position, yoke means providing a common mounting for said plungers, and reciprocating means pivotally connected to said yoke means at a center point to permit differential movement of one plunger with respect to the other when one of said plungers is blocked by displacement of said needle, said drive means actuating said reciprocating means.

6. The combination claimed in claim 5 in which said sensing means includes means for locking said needle against movement during operation of said plungers.

7. In a camera, the combination of a camera lens system and adjustable lens stop means therefor, an electric circuit including a photoelectric component and a meter in series circuit therewith, and having a displaceable needle responsive to the electrical energy input to said meter, power driven means for mechanically sensing the direction of displacement of said needle, control means driven by said sensing means for regulating said electrical energy input, means connecting said adjustable lens stop means and said control means whereby the aperture of said camera lens system is automatically controlled in accordance with said electrical energy input, and drive means in said camera for driving said sensing means, said mechanical sensing means comprising a pair of spaced reciprocating plungers, and said control means comprising a rotatable shaft, means on said shaft providing oppositely disposed ratchet teeth, and a pawl connected with each one of said plungers, said pawl means being arranged on opposite sides of said tooth providing means so that cooperation of one of said pawls with one set of ratchet teeth will rotate the shaft in one direction, and cooperation of the other pawl with the other set of teeth will rotate said shaft in the opposite direction.

8. In a camera, the combination of a camera lens system and adjustable lens stop means therefor, an electric circuit including a photoelectric component and a meter in series circuit therewith, and having a displaceable needle responsive to the electrical energy input to said meter, power driven means for mechanically sensing the direction of displacement of said needle, control means driven by said sensing means for regulating said electrical energy input, means connecting said adjustable lens stop means and said control means whereby the aperture of said camera lens system is automatically controlled in accordance with said electrical energy input, and drive means in said camera for driving said sensing means, said mechanical sensing means comprising a pair of spaced reciprocating plungers, the axes of which are disposed on opposite sides of said needle so that displacement of said needle to either side of a neutral position will block movement of one of said plungers, yoke means providing a common mounting for said plungers, reciprocating means pivotally connected to said yoke means at a center point to permit differential movement of one plunger with respect to the other when one of said plungers is blocked by displacement of said needle, and cam means for actuating said reciprocating means, said drive means driving said cam means, and said control means comprising a rotatable shaft, means on said shaft providing oppositely disposed ratchet teeth, and a pawl connected with each one of said plungers, said pawl means being arranged on opposite sides of said tooth providing means so that cooperation of one of said pawls with one set of ratchet teeth will rotate the shaft in one direction, and cooperation of the other pawl with the other set of teeth will rotate said shaft in the opposite direction, the tooth spacing being such that said ratchet teeth are not engaged by said pawls except when displacement of the needle causes differential movement of said plungers.

9. A motion picture camera comprising, in combination, a camera lens system, an adjustable iris therefor, a motor for driving said camera, a light meter mounted in said camera and including a photovoltaic cell and a meter in series circuit therewith, a lens system for said photovoltaic cell such that the objective field of said lens system is coextensive with the objective field of said camera lens system, an adjustable iris for said cell lens system, said meter having a displaceable needle, the position of which corresponds with the light energy input of said photovoltaic cell, stop means engaged by said needle when displaced in either direction from a neutral position, means driven by said motor for mechanically sensing the position of said needle, a control mechanism including a rotatable shaft actuated by said sensing means for angular displacement in either direction corresponding to the displacement of said needle to either side of a neutral position, and means connecting both of said adjustable iris means with said rotatable shaft so that the light energy input of said photoelectric cell is maintained constant by expansion or contraction of said cell iris, and so that said camera iris is regulated accordingly to provide substantially constant light energy input for a film disposed in cooperative relationship with said camera lens.

10. A motion picture camera as claimed in claim 9 including means for adjusting the angular relationship of said camera iris with respect to said cell iris so that the light energy input through said camera lens may be increased or decreased manually with respect to the constant light energy input of said photovoltaic cell to accommodate different films speeds.

References Cited in the file of this patent
UNITED STATES PATENTS

| | | |
|---|---|---|
| 2,388,609 | Ericsson | Nov. 6, 1945 |
| 2,655,086 | Walker | Oct. 13, 1953 |
| 2,655,848 | Gray | Oct. 20, 1953 |
| 2,838,985 | Burger et al. | June 17, 1958 |

FOREIGN PATENTS

| | | |
|---|---|---|
| 763,279 | France | Feb. 12, 1934 |
| 429,676 | Great Britain | June 5, 1935 |
| 821,026 | France | Aug. 17, 1937 |
| 909,294 | Germany | Apr. 15, 1954 |